(12) United States Patent
Wendt et al.

(10) Patent No.: US 11,775,039 B2
(45) Date of Patent: Oct. 3, 2023

(54) POWER PROVIDING DEVICE AND METHOD

(71) Applicant: PHILIPS LIGHTING HOLDING B.V., Eindhoven (NL)

(72) Inventors: Matthias Wendt, Eindhoven (NL); Lennart Yseboodt, Eindhoven (NL); Marcus Johannes De Ruijter, Eindhoven (NL); Joost Jacob Brilman, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 620 days.

(21) Appl. No.: 15/752,521

(22) PCT Filed: Aug. 5, 2016

(86) PCT No.: PCT/EP2016/068792
§ 371 (c)(1),
(2) Date: Feb. 13, 2018

(87) PCT Pub. No.: WO2017/029137
PCT Pub. Date: Feb. 23, 2017

(65) Prior Publication Data
US 2018/0239407 A1 Aug. 23, 2018

(30) Foreign Application Priority Data
Aug. 20, 2015 (EP) .................................... 15181671

(51) Int. Cl.
*G06F 1/00* (2006.01)
*G06F 11/30* (2006.01)
(Continued)

(52) U.S. Cl.
CPC .............. *G06F 1/263* (2013.01); *H04L 12/10* (2013.01); *H04L 12/40045* (2013.01); *G06F 1/266* (2013.01)

(58) Field of Classification Search
None
See application file for complete search history.

(56) References Cited

U.S. PATENT DOCUMENTS 5,034,746 A * 7/1991 Herbst .................. H03M 1/368
341/172
5,652,507 A * 7/1997 Blakely .................. G01R 15/18
323/356

(Continued)

FOREIGN PATENT DOCUMENTS

| CN | 102113270 A | 6/2011 |
| CN | 103257622 A | 8/2013 |

(Continued)

OTHER PUBLICATIONS

Galit Mendelson, "All You Need to Know About Power over Ethernet and the 802.3af Standard", PowerDsine White Paper, Jun. 2004 (Jun. 2004).

(Continued)

*Primary Examiner* — Xuxing Chen

(57) ABSTRACT

The invention relates to a power providing device (2) for providing power to a plurality of power receiving devices (31), a power distribution system including such power providing device (2), a method for providing power to a plurality of power receiving devices (31) and a corresponding computer program. During standby the power providing device (2) is beneficially supplied with power coming from a power source (1) dedicated or adjusted for the low energy consumption, e.g. a uplink port (23) or a shared power bus. The current drawn from such power source (1) (or the power provided to the downlink power receiving devices (31)) is (Continued)

measured and, for example, the derivative is used in order detecting a current increase just when it starts. This information may be used such the main power supply (29) gets started in order to be available for more power demand than available through the hierarchical powering coming from the standby power source (1).

15 Claims, 2 Drawing Sheets

(51) Int. Cl.
*G06F 1/26* (2006.01)
*H04L 12/10* (2006.01)
*H04L 12/40* (2006.01)

(56) References Cited

U.S. PATENT DOCUMENTS

| | | | | |
|---|---|---|---|---|
| 5,894,212 A * | 4/1999 | Balogh | ................ | H02J 7/0026 320/116 |
| 6,636,976 B1 * | 10/2003 | Grochowski | ............. | G06F 1/28 713/320 |
| 7,840,821 B2 * | 11/2010 | Krishnan | .............. | G06F 1/3203 713/300 |
| 10,042,403 B2 * | 8/2018 | Wendt | .................... | H05B 45/00 |
| 10,110,387 B2 * | 10/2018 | Wendt | ............... | H04L 12/40045 |
| 10,216,255 B2 * | 2/2019 | Yseboodt | ................ | G06F 1/266 |
| 10,313,138 B2 * | 6/2019 | Yseboodt | ................ | H04L 12/10 |
| 10,412,799 B2 * | 9/2019 | Yseboodt | ............ | H04L 12/6418 |
| 10,671,146 B2 * | 6/2020 | Wendt | .................... | H04L 12/10 |
| 2005/0060587 A1 | 3/2005 | Hwang et al. | | |
| 2006/0082220 A1 * | 4/2006 | Karam | ............. | H02J 13/00012 307/4 |
| 2007/0075586 A1 | 4/2007 | Bogue | | |
| 2008/0191558 A1 * | 8/2008 | Azuma | ................... | H04L 12/10 307/80 |
| 2008/0294917 A1 * | 11/2008 | Khan | .................... | G06F 1/3209 713/310 |
| 2009/0094469 A1 * | 4/2009 | Kitamrua | .............. | G06F 1/3203 713/320 |
| 2009/0174262 A1 * | 7/2009 | Martin | .................. | H02M 3/157 307/82 |
| 2009/0217088 A1 | 8/2009 | Diab | | |
| 2010/0194358 A1 | 8/2010 | Stanford-Clark | | |
| 2011/0007773 A1 * | 1/2011 | Dobbeler | .................. | F27B 3/28 373/60 |
| 2014/0021283 A1 * | 1/2014 | Tracey | ............... | B65H 75/4484 242/390.9 |
| 2014/0082385 A1 * | 3/2014 | Reule | .................... | G06F 1/3275 713/320 |
| 2014/0115361 A1 * | 4/2014 | Martin | ...................... | G06F 1/28 713/322 |
| 2014/0258738 A1 | 9/2014 | Greenwalt et al. | | |
| 2015/0121113 A1 | 4/2015 | Ramamurthy et al. | | |
| 2016/0100048 A1 * | 4/2016 | Hillaert | ................... | H04M 3/22 379/32.01 |
| 2018/0239407 A1 * | 8/2018 | Wendt | .................... | H04L 12/10 |

FOREIGN PATENT DOCUMENTS

| | | |
|---|---|---|
| CN | 104205562 A | 12/2014 |
| EP | 1942600 A1 | 7/2008 |
| GB | 2462312 A | 2/2010 |
| WO | 2011151773 A1 | 12/2011 |
| WO | 2015066024 A1 | 5/2015 |

OTHER PUBLICATIONS

"Power over Ethernet.com", http://www.poweroverethernet.com/. http://en.wikipedia.org/wiki/Power_over_Ethernet.

* cited by examiner

POWER PROVIDING DEVICE AND METHOD

CROSS-REFERENCE TO PRIOR APPLICATIONS

This application is the U.S. National Phase application under 35 U.S.C. § 371 of International Application No. PCT/EP2016/068792, filed on Aug. 5, 2016 which claims the benefit of European Patent Application No. 15181671.7, filed on Aug. 20, 2015. These applications are hereby incorporated by reference herein.

FIELD OF THE INVENTION

The invention relates to a power providing device for providing power to a plurality of power receiving devices, a power distribution system including such power providing device, a method for providing power to a plurality of power receiving devices and a corresponding computer program.

BACKGROUND OF THE INVENTION

A known concept for providing power to a plurality of power receiving devices is Power-over-Ethernet (in the following also referred to as "PoE"; described, for example, in the IEE802.3af/at standard and currently being extended towards 4-pair power in the IEEE Task Force P802.3bt).

In the context of PoE, a power providing device is called Power Sourcing Equipment (PSE) and a power receiving device is called Powered Device (PD). It is to be noted, however, that a PSE may also receive power from another PSE, such that such PSE has a dual status of being a PD with respect to the uplink PSE and a PSE with respect to the downlink PDs (see, for example, WO 2011/151773 A1, where a power supply during standby is provided by an upstream PoE switch/PSE).

For example, in PoE lighting systems (see FIG. 1, discussed below) the PDs may be e.g. light sources, user interface devices (UIs) and sensors.

A power control system arranged for use in a power-over-Ethernet (PoE) system according to GB 2462312 A comprises a battery, a battery charging unit connected to, and for charging, the battery and a processor arranged to monitor the charge level of the battery and, in response, to direct current to, or away from, the battery. The power-over Ethernet system for delivering power to a load comprises a powered device and an Ethernet power sourcing device configured to supply DC power to the powered device.

When now the main loads are off (which may mean in lighting systems lights are off) only the connectivity system and the sensors and UIs may need to be supplied with power. Typically the power required during such so called standby situation is very low. In an example as shown in FIG. 1, a typical value can be about 0.5 W per idling node making a total of 4 W plus the internal power need of the PoE switch/the PSE in an eight port PSE.

Such power demand is small enough to be easily satisfied by an uplink PSE, even though other means for obtaining standby power may be employed as well. Remaining within PoE, the standby situation allows that a mains power supply of a PSE converting mains power to the PoE power levels can be fully switched off as the switch of the PSE can still work powered from uplink.

In a standby situation no load is presented to an operation power supply (or mains power supply) of the PSE, which, during normal (full-power) operation, provides power to be distributed to the PDs. If such operation power supply is maintained active, energy is wasted simply due to the power supply being active. If, on the other side, the power supply is deactivated, a problem arises in terms of the transition from the standby situation to a normal operation situation. As the power which can be supplied by the PSE with the operation power supply being switched off is rather limited, with a rising power demand of the connected PDs an overpower protection situation may occur (with the power demand exceeding the available power), such that the provision of power to the PDs is temporally shut down, possibly causing a flickering or the like.

SUMMARY OF THE INVENTION

It is an object of the present invention to provide to a power providing device for providing power to a plurality of power receiving devices, a power distribution system including such power providing device, a method for providing power to a plurality of power receiving devices and a corresponding computer program allowing for a reduction or even avoidance of the above mentioned drawbacks. In particular, the invention attempts to provide an approach to allow for seamless power availability for the power receiving devices without undue waste of energy.

In a first aspect of the present invention, a power providing device is presented for providing power to a plurality of power receiving devices, comprising an operation power unit arranged to receive, in an operation mode of the power providing device, operation power from an external operation power source, a standby power unit arranged to receive, in a standby mode of the power providing device, standby power from a standby power source, the standby power being lower than the operation power, a power distribution unit arranged to forward power received from the operation power unit or the standby power unit to one or more power receiving devices, and a power control unit arranged to control the operation power unit to switch between an ON-state and an OFF-state, wherein the power control unit includes a power monitoring section arranged to monitor the power forwarded by the power distribution unit, wherein the power control unit is arranged to control the operation power unit to switch to the ON-state when the power monitoring section detects that an increase of the power forwarded by the power distribution unit over a predetermined monitoring period exceeds a predetermined detection threshold, thus switching from the standby mode to the operation mode.

In a second aspect of the present invention, a power distribution system is presented, comprising an operation power source, a standby power source, providing less power than the operation power source, the power providing device according to the first aspect coupled to the operation power source and the standby power source, and a plurality of power receiving devices coupled to the power providing device.

In a third aspect of the present invention, a method of providing power to a plurality of power receiving devices by a power providing device is presented, comprising a standby power provision step, in which the power providing device receives, in a standby mode, standby power from a standby power source and forwards power to one or more power receiving devices, a transition step, in which the power providing device receives, in the standby mode, standby power from the standby power source and forwards power to one or more power receiving devices and prepares for a power reception from an external operation power source, and an operation power provision step, in which the power providing device receives, in an operation mode, operation power from the operation power source and forwards power to one or more power receiving devices, the operation power provision step following the transition step upon completion of the preparation for power reception from the operation power source, the standby power being lower than the operation power, wherein, during the standby power step, a monitoring sub-step of monitoring the power forwarded by the power providing device is provided, wherein the method proceeds from the standby power provision step to the transition step when in the monitoring sub-step it is detected that an increase of the forwarded power over a predetermined monitoring period exceeds a predetermined detection threshold.

The present invention allows for a system in which a power supply from a power providing device to multiple power receiving devices is provided and which allows different levels of efficient standby supply. The inventors realized that a very fast method may be utilized to detect increase in power needs of the power providing device during standby. This may be done in a way that the supply demand is detected very early, allowing for rapid power-up of a main supply circuitry.

As indicated above, during standby the power providing device is beneficially supplied with power coming from a power source dedicated or adjusted for the low energy consumption, e.g. a uplink port or a shared power bus. The current drawn from such power source (or the power provided to the downlink power receiving devices) is measured and, for example, the derivative is used in order detecting a current increase just when it starts. This information may be used such that the main power supply gets started in order to be available for more power demand than available through the hierarchical powering coming from the standby power source.

In the context of Power-over-Ethernet in particular, an interesting feature is to forward power received from a higher hierarchical level down into the loads (PDs) of the PSE in between. This invention provides, for example, a power management in the in-between-PSE (2) and allows that hardware/software means are employed to guarantee for a seamless power availability at the loads of the PSE (i.e. the PDs connected to the PSE).

The gist of the invention lies in the support for a preferably seamless switch over from a standby supply to an operation supply. Here, it is however to be noted that the operation power supply may also be provided in case of an "emergency", e.g. a situation where—perhaps only temporarily—more power is needed than is presently available and where the inclusion of such additional power may not be provided instantaneously. A core idea of the inventors is that the operation power supply is (re-)activated whenever the present power demand (e.g. the current drawn by the power receiving devices) starts to grow more than a certain power change threshold.

It is to be noted that the standby power requirement or demand of a power receiving device may slightly change over time, even though such slight change is not indicative of a change from, for example, a standby state of the power receiving device to a more power consuming operation state. Examples for causes of such slight increase may be additional charging of a battery, higher noise level for a wireless link requiring a higher power transmission or increased losses in some components. Preferably, the detection threshold is determined in such manner that such expectable slight increase—under normal circumstances—does not cause a switching to the ON-state of the operation power unit.

In a preferred embodiment, the power monitoring section is arranged to monitor the forwarded power by monitoring a current.

In a significant number of implementation, a constant (or substantially constant) voltage is provided, so that a measurement of changes in the current directly reflects changes in the power.

In a preferred embodiment, the power monitoring section is arranged to compare a first power and a second power forwarded respectively, wherein the interval between the time of forwarding the first power and the time of forwarding the second power corresponds to the monitoring period.

It is not necessary to monitor the power/current continuously, if the monitoring period is sufficiently short to allow for a detection early enough to control the operation power unit to switch to the ON-state. By detecting or measuring the forwarded power (e.g. by means of the drawn current) in intervals, the interval as such already provides for an averaging of the change in power over time.

In a preferred embodiment, the power monitoring section is arranged to determine a first derivative of the forwarded power, wherein the power control unit is arranged to control the operation power unit to switch to the ON-state when the power monitoring section detects that the first derivative of the forwarded power exceeds a predetermined detection derivative threshold wholly during the predetermined monitoring period or that an average of the first derivative of the forwarded power over the predetermined monitoring period exceeds the predetermined detection derivative threshold.

Instead of measuring the forwarded power as such, i.e. in absolute or relative terms, and consider the development of the forwarded power with passing time, the derivative (i.e. change rate in power) may be measured directly. Here, it is preferred to the measure the first derivative. If, however, in a particular implementation a measurement of the second derivative allows for reasonable results, in particular in terms of a low noisiness of the second derivative measurement, also the second derivative may be considered (in addition or as an alternative to measuring the first derivative).

In a preferred embodiment, the power control unit has a standby state and a control state, wherein the power control unit is arranged to switch from the standby state to the control state when the power monitoring section detects that an increase of the power forwarded by the power distribution unit over a predetermined pre-detection monitoring period exceeds a predetermined pre-detection threshold, and wherein, in the control state, the power control unit is arranged to control the operation power unit to switch to the ON-state when the power monitoring section detects that the increase of the power forwarded by the power distribution unit over the predetermined monitoring period exceeds the predetermined detection threshold, wherein the pre-detection monitoring period is longer than the monitoring period and/or the pre-detection threshold is lower than the detection threshold.

It is possible to provide for a state of "heightened attention", in which, for example, a sampling frequency is higher (i.e. the intervals between detections of power and/or derivative are shorter). A benefit of such approach is that due to the longer intervals, there is provided a smoothing effect on the measurements as short time peaks may not cause unjustified changes in the operation mode.

On the other side, however, a benefit to always using the highest possible sampling frequency is that the onset of an increased power demand may be detected as early as possible.

In a preferred embodiment, the predetermined detection threshold is adjusted in consideration of the power forwarded by the power distribution unit in relation to a limit of the standby power. In such embodiment, there is provided a modification to the detection threshold, for example, depending on the difference between the presently forwarded power and the maximum power to be forwarded based on the standby power source. If, for example, the currently forwarded power is already rather close to the maximum supported power, a more sensitive (i.e. lower) detection threshold may be provided.

It is not necessary that the adjustment of the determined detection threshold corresponds to a continuous function of, for example, a difference between the currently forwarded power and the maximum power possible during standby, as other relations like a stepwise adjustment are also possible. Furthermore, it is not necessary that the adjustment is provided continuously or quasi-continuously and it may be sufficient if there are provided intervals between possible adjustments as long as the interval and the predetermined monitoring period as selected such that an excessive increase in power consumption may be detected properly.

In a preferred embodiment, the standby power source is a power source device arranged to provide power to multiple power providing devices and/or power receiving devices, wherein the power providing device includes a negotiation unit for negotiating an amount of provided standby power with the power source device.

The ability to conduct a negotiation for the standby power gives the benefit that the standby power may also be adjusted to the actual need of the connected power receiving devices (and the power providing device) during standby, thus allowing for an efficient distribution of the power available at the hierarchy above the power providing device according to the invention.

In a modification of the above preferred embodiment, the power control unit is arranged to cause a re-negotiation of the amount of provided standby power with the power source device, when the power monitoring section detects that an increase of the power forwarded by the power distribution unit over a predetermined re-negotiation monitoring period exceeds a predetermined re-negotiation threshold.

If the re-negotiation monitoring period corresponds to the power monitoring period, said re-negotiation threshold is smaller than the detection threshold. The re-negotiation threshold may correspond to the detection threshold, provided the re-negotiation monitoring period is longer than the power monitoring period.

In an advantageous variation of the above modification, the standby power unit is arranged to receive, at least during a period needed for the re-negotiation, standby power from an auxiliary standby power source (e.g. an internal (possibly rechargeable) battery or an external power bus).

If, as it is for example the case in the known context of Power-over-Ethernet, a re-negotiation of the provided power includes a cut of power (e.g. caused by a voluntary overload situation or in reaction to a signal provided by other means (e.g. LLDP)), the power providing device may attempt such re-negotiation while ensuring that during the re-negotiation process standby power may still be received from the auxiliary standby power source and forwarded to the power receiving devices. Preferably, the auxiliary standby power source provides enough power such that in case of a failed re-negotiation there is still sufficient time for powering up the operation power unit.

Thus, if there is an increase in the forwarded power which is not large enough to trigger the switching of the operation power unit to the ON-state but which is of such magnitude that would nevertheless justify an attempt to increase the amount of available standby power (e.g. if there is a rather small but steady increase in the power demand due to aging of the power receiving devices), the power providing device may make use of an overpower cycle with the power source device in order to allow for a re-negotiation of the provided standby power.

In a preferred embodiment, the standby power source is at least one of an external power bus and an internal battery.

Depending on the power needs during standby, power may be provided in variety of ways, including an internal power supply.

In a preferred embodiment, the power providing device is a power source equipment according to a Power-over-Ethernet standard.

In a modification of the above preferred embodiment, the power providing device is arranged to receive standby power from the standby power source according to the Power-over-Ethernet standard.

The present invention may be used with particular benefit in the context of Power-over-Ethernet. It is, however, to be noted that the present invention is not limited to Power-over-Ethernet.

In a preferred embodiment, the power monitoring section is arranged to compare the power forwarded by the power distribution unit and/or an amount of power forwarded to a particular power receiving device with a respective overpower threshold, wherein the power providing device is arranged to shut down a forwarding of power to one or more of the power receiving devices based on a comparison result of the power monitoring section.

The power monitoring section may be used also as a safeguard against overpower situations. In terms of designing an implementation of a power providing device according to the invention based on existing designs of power providing devices it may be beneficial to provide the power monitoring section separately from previously provided circuitry safeguarding against overpower situations, as such conventional circuitry is normally not designed for rapid detection of small changes in forwarded power.

In a preferred embodiment, the power providing device further comprises a setting unit arranged to adjust the predetermined monitoring period and/or the predetermined detection threshold based on a currently forwarded power and/or a power limit of the standby power.

Following such adjustment, the power providing device may "learn" about a typical situation of the actual implementation.

In a preferred embodiment, the power providing device further comprises a communication unit arranged to detect communication data provided to one or more of the power receiving devices, wherein the power control unit is arranged to control the operation power unit to switch to the ON-state when detected communication data indicates an imminent increase in a power demand of one or more of the power receiving devices.

In addition to the detection of the forwarded power, further information may be used to recognize a situation in which the power demand of the power receiving devices is about to increase. Such additional information may be derived, for example, for data or commands given to the power receiving device. In particular in the context of Power-over-Ethernet and similar concepts, the cable for providing power are also used for communication, such that the detecting of the communication data may be achieved in an easy way. The power providing device may, nevertheless, be provided with other communication means or protocols, e.g. wireless or Bluetooth, so to detect communication data given to coupled power receiving devices.

In a further aspect of the present invention a computer program is presented for providing power to multiple power receiving devices, the software product comprising program code means for causing a power providing device according to the invention to carry out the steps of the method according to the invention when the software product is run on the power providing device.

It shall be understood that the power providing device of claim 1, the power distribution system of claim 13, the method for providing power of claim 14, and the computer program of claim 15 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
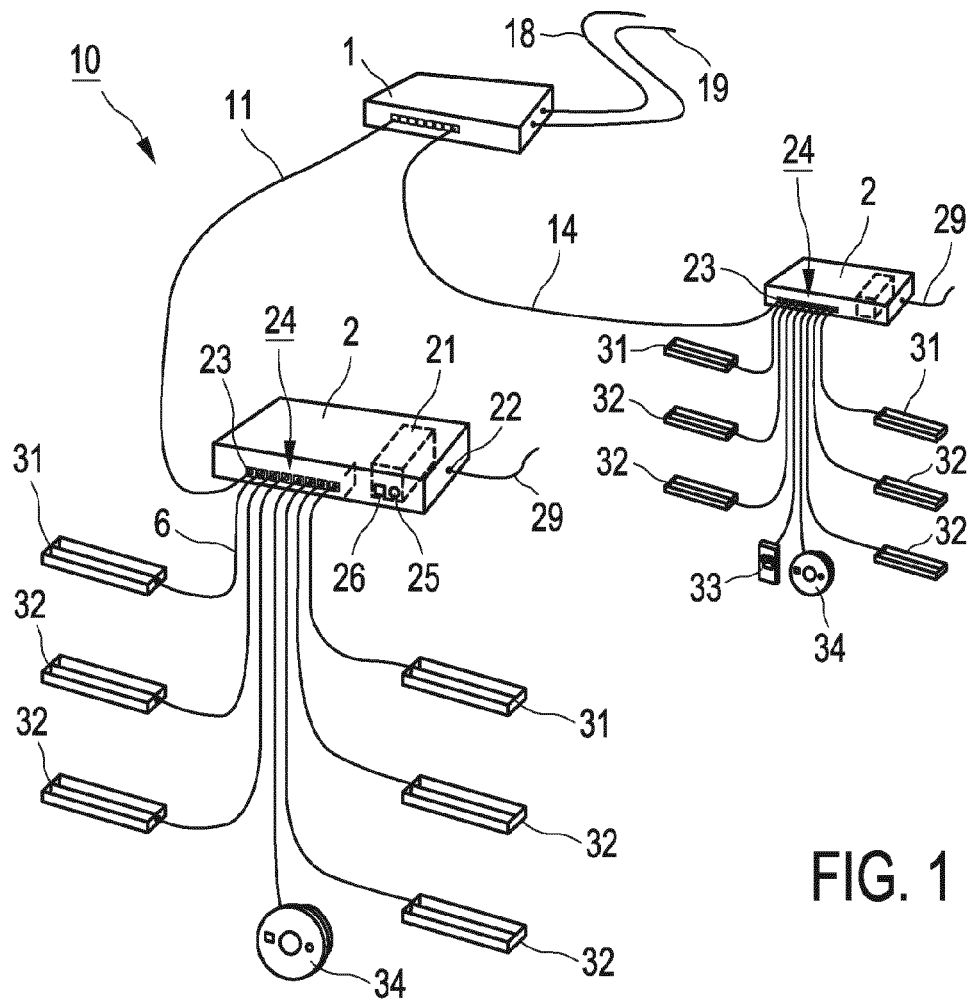
FIG. 1 shows a power distribution system in accordance with an embodiment of the invention, FIG. 2 schematically shows elements of a power providing device in accordance with another embodiment of the invention.

FIG. 1 shows a power distribution system in accordance with an embodiment of the invention.

The power distribution system 10 shown in FIG. 1 provides the basic function of a conventional lighting system utilizing a cascaded Power-Over-Ethernet approach.

The system includes a center PSE 1 operating as a standby power source to two further PSEs 2, which are each an examples of a power providing device 2 of the present invention.

The center PSE 1 has a data connection 18 and a power connection 19 (i.e. the center PSE is supplied with power from a mains (not shown). It is connected though cables 11, 14 from respective PoE ports to the further PSEs 2.

The uplink connection by cable 11 from the center PSE 1 to the further PSE 2 is provided by means of a patch cable 11.

Inherent to the system and the PoE approach, the center PSE 1 can supply only limited power over the connection by cable 11, such that the amount of power which can be provided from the center PSE 1 to the further PSE 2 is not sufficient for a typical regular operation of all loads connected to the further PSE 2 but sufficient for a standby mode, in which only minimum power is needed.

The further PSE 2 is provided with a connection 22 to a mains power supply 29. For coupling to the cable 11/the center PSE 1, the further PSE includes a port 23. Further to this incoming port 23, the further PSE 2 is equipped with a plurality of outgoing ports 24, to which, by means of patch cables 6, power receiving devices are connectable in the form of lighting elements 31, 32, user interface devices 33 and/or sensors 34.

The connection 22 is coupled to a main power circuit 21, which is an example of an operation power unit.

The further PSE 2 includes a button 25 and a signal indicator 26. By pressing the button 25 the user of the system 10 is able to manually calibrate, after installation, the current (or more generally the power demand) during a typical standby situation. The signal indicator 26 is used to show the standby state, e.g. for diagnostics.

Figure 2:
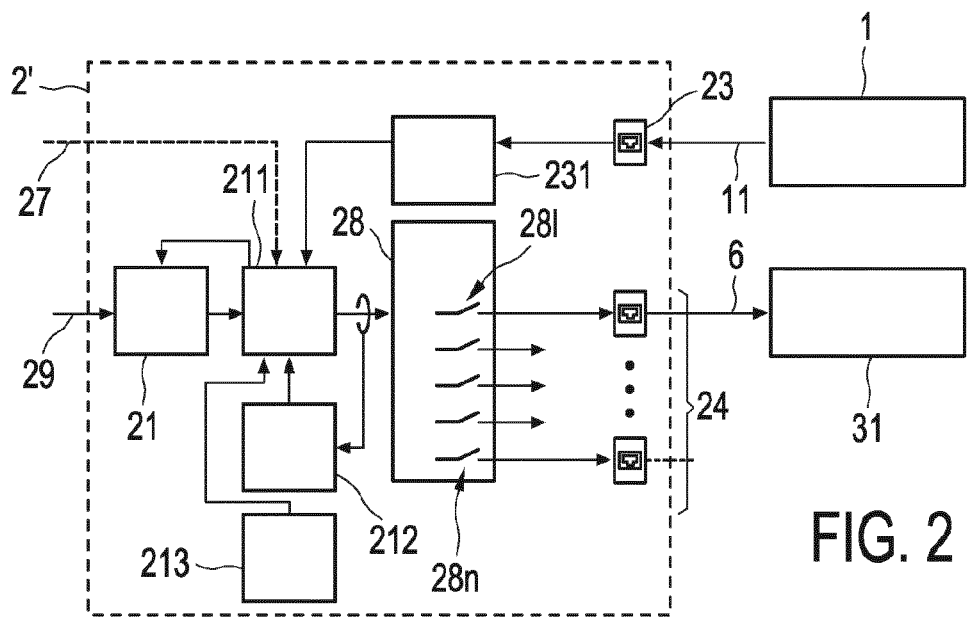

FIG. 2 schematically shows elements of a power providing device in accordance with another embodiment of the invention.

The PSE 2' shown FIG. 2 is slightly modified in comparison to the further PSE 2 shown in FIG. 1, in that it is also equipped to be provided with power from an auxiliary DC power bus 27. Thus, in this embodiment, there are three potential power sources: AC Mains 29; auxiliary DC power bus 27 and the PoE uplink power 11.

The PSE 2' as an example of a power providing device of the present invention includes, in addition to the main power circuit 21 (an example of an operation power unit), the incoming port 23 (which leads to an uplink PD unit 231 as an example of a standby power unit including a negotiation unit) and the outgoing port 24 mentioned above, further a standby manager 211 (as an example of a part of a power control unit), a current observer 212 (as an example of a power monitoring section) and a data observer 213 (as an example of a communication unit). Further a PSE manager 28 (an example of a power distribution unit) is provided, including switches 281-28n for selectively supplying power to one of the outgoing ports 24. As the general concept of provision of power by means of PoE is known, no further explanation of the PSE manager 28 is needed.

The overall PSE power management (provided by the standby manager 211 and the current observer 212) is constantly monitoring the power/current flow to the outgoing ports 24. This means measuring the power as required by all connected PDs 31. A separate current measurement is used in this embodiment as the inventors expect that the typically available monitoring of current flow integrated with a conventional PSE management circuitry 28 would not allow a fast enough response.

The known PSE manager 28 itself is capable of measuring current (per channel), while in this embodiment an external current transducer (LEM) is used as polling of the PSE manager's I²C current measurement registers to be too slow. The standby manager 211 switches over between the potential sources and activates/deactivates the mains supply 21.

As long as the total PD load is substantially below the power negotiated over the uplink with the uplink center PSE 1 the mains supply is deactivated and the power is taken from the uplink. This negotiation is carried out by the uplink PD unit 231 which is part of the cascadable PSE 2'. Alternatively the standby power can also be routed from an auxiliary DC power bus 27.

The standby manager 211 may be using data observations provided by the data observer 213 on the transported data packets to influence the decision which power source to take. For example, data flowing to one of the PDs 31 may already control the power supply 21 to be reactivated.

Furthermore, upon pressing of a button (not shown in FIG. 2), the standby manager is arranged to adjust the predetermined monitoring period and the predetermined detection threshold based on a currently forwarded power and a power limit of the standby power.

Figure 3:
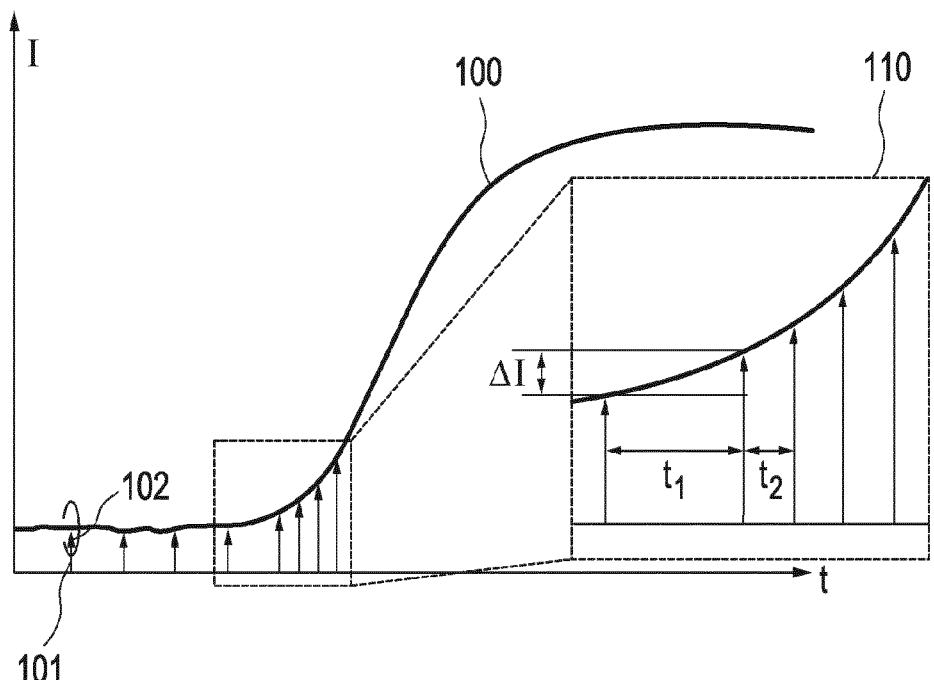
FIG. 3 shows a graph illustrating a current monitoring in accordance with an embodiment of the invention.

FIG. 3 shows a graph illustrating a current monitoring in accordance with an embodiment of the invention.

The core of the invention is the process of switching over from a standby situation powered over the uplink (in the embodiments discussed above using cascaded PoE) to mains supply. If this process is not quickly enough able to carry the required power the uplink will go into overpower protection and the PDs will experience a short power outage. In order to quickly switch over to the mains supply the current monitoring may uses adaptive sampling technique as illustrated in FIG. 3

The standby manager (see FIG. 2) may use a hardware means to evaluate the current derivative dI/dt. If the derivative is substantially above a defined threshold the mains supply will get reactivated again.

FIG. 3 shows a current waveform 100 during an end of a standby situation. The magnified portion 110 gives more details. At certain times 101 a sample of the current 102 is taken. The distance between samples is the time $t_1$. When the difference in the samples ΔI is getting higher than a defined threshold the distance between samples gets reduced to $t_2$. In this example the distance is reduced to 25%.

It needs to be noted that, alternatively or in addition, in order to act on rapid current changes in between sample moments, the derivative (HW circuitry) of the continuously measured current may be compared to a dI/dt threshold. The output of this comparison may enable the power supply 21 (through an uC interrupt).

Figure 4:
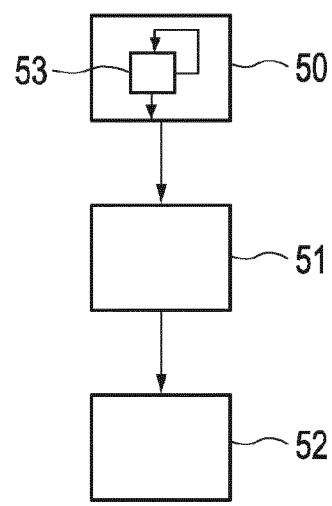
FIG. 4 shows a flow diagram illustrating a method of providing power according to an embodiment of the invention.

FIG. 4 shows a flow diagram illustrating a method of providing power according to an embodiment of the invention.

Power is provided to a plurality of power receiving devices by a power providing device.

In a first standby power provision step 50 the power providing device receives power from a standby power source and forwards power to one or more power receiving devices.

Next, there is a transition step 51, in which the power providing device receives power from the standby power source and forwards power to one or more power receiving devices and prepares for a power reception from an external operation power source.

Following the transition step 51, there is an operation power provision step 52, in which the power providing device receives power from the operation power source and forwards power to one or more power receiving devices The operation power provision step 52 follows the transition step 51 (not before—but not necessarily directly) after completion of the preparation for power reception from the operation power source.

During the standby power step 50, there is repeatedly provided a monitoring sub-step 53 of monitoring the power forwarded by the power providing device.

The method proceeds from the standby step 50 to the transition step 51 when in the monitoring sub-step 53 it is detected that an increase of the forwarded power over a predetermined monitoring period exceeds a predetermined detection threshold.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

For example, it is possible to operate the invention in an embodiment wherein power is distributed following approaches other than Power-over-Ethernet.

In addition, the present invention is not limited to three layers including the (operation and standby) power supply, the power providing device(s) and the power receiving devices, as a power receiving device may again be implemented such that further power receiving devices may be provided with power in a further level.

The operation power unit is not limited to having just an OFF-state and one ON-state, as different levels of the ON-state are also contemplated. It is possible, for example, that the operation power unit is designed modularly, i.e. includes several (possibly independent) operation power sub-units, each of which may have an ON-state and an OFF-state, resulting in multiple states between the OFF-state of the operation power unit (also a sub-units are in their OFF-state) and an ON-state of the operation power unit in which also all sub-units are in their ON-state. The different sub-units do not necessarily have to have the same power rating or capabilities.

In the context of the invention, it is not necessarily the case that there is a distinction between such multiple states, as any one of the states may be identified with the ON-state to which the operation power unit is switched when the power monitoring section detects that an increase of the power forwarded by the power distribution unit over a predetermined monitoring period exceeds a predetermined detection threshold.

It is nevertheless possible that the amount of power needed after switching to the ON-state is estimated before switching (e.g. based on the amount of increase in the power consumption of the power receiving devices) or determined based on external information (e.g. information received by the communication unit) and that the particular ON-state (i.e. the combination of ON- and OFF-states of the sub-units) appropriate for such power demand is then selected and switched to.

It is further contemplated that the power providing device includes several operation power units, wherein each power unit is provided for a particular set of ports (i.e. connected power receiving devices). The invention may here be implemented such that the power consumed by a (fixed or selectively assigned) set of power receiving devices assigned to a particular operation power unit is considered independently from that of power receiving devices not belonging to the set. It is nevertheless also possible that the detection of an increase of the power forwarded by the power distribution unit over a predetermined monitoring period which exceeds a predetermined detection threshold may be used for controlling also the ON-state of operation power unit not related as such to the considered power receiving devices. In other words, the finding that a standby state of a selected number of power receiving devices is about to end may indicate that a similar situation is present for other power receiving devices.

In preferred embodiments of the present invention, the standby power source provides power by means of Power-over-Ethernet or in a comparable manner. Alternatively or in addition, an external power bus and/or an internal battery may be provided as standby power source. Yet, as a further alternative or also in addition, the standby power source may also be mains, provided that the standby power unit is arranged to efficiently provide the low standby power also from mains power.

In an implementation of the present invention a method is provided for seamlessly supplying power receiving devices in a power distribution system wherein a current monitoring for the sum of power receiving devices' currents is used for ending standby operation. In such implementation, the standby power is provided from uplink according to Power-over-Ethernet, while it is also possible that a separate standby supply bus is provided as an alternative to a mains supply for standby. In particular, a derivative of the current may be observed. Whenever it is bigger than a threshold the standby operation would be ended. A dI/dt threshold comparator might be implemented to act in between sample moments and as soon as the dI/dt value crosses the threshold the mains supply is enabled as quick as possible. Depending on the particular needs of the implementation, a sample distance may be adjusted (reduced) whenever the current difference between succeeding samples is greater than a predefined threshold. On the other hand, the inventors consider, in particular from an embedded point of view, the behavior of a system as being more predictable at a fixed sample rate, which may be as high as possible in order to avoid a switch from standby to operation mode to be too late. The invention may also include a method of ending standby in combination with the overall system control system, e.g. by monitoring and parsing traffic or commands towards the load devices which are in standby mode.

Even though the above discussion primarily focuses on a lighting system, the present invention may be used also in other contexts. Particularly useful application of this invention may be provided in PoE lighting, HVAC and sensing networks, e.g. in professional buildings where efficient low load and standby support is essential or very desirable.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like forwarding of power, monitoring, detecting, comparing and controlling can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A power providing device for providing power to a plurality of power receiving devices, comprising:
   a power distribution unit including switches to forward operation power received from an external power source or standby power received from a standby power source, the standby power being lower than the operation power, to one or more power receiving devices,
   a processor to control the switching between an ON-state and an OFF-state during an operation mode when operation power is received, and to monitor power forwarded during a standby mode when standby power is received, by sampling said power at a periodic rate, and adjust the periodic rate using an adaptive sampling technique, wherein when a difference in current samples is higher than a predetermined threshold time between samples is reduced,
   wherein the processor controls switching to the ON-state when an increase of the power forwarded detected over a predetermined monitoring period exceeds a predetermined detection threshold, thus switching from the standby mode to the operation mode.

2. The power providing device according to claim 1, wherein the processor is arranged to monitor the forwarded power by monitoring a current.

3. The power providing device according to claim 1, wherein the processor is arranged to compare a first power and a second power forwarded respectively, wherein an interval between the time of forwarding the first power and the time of forwarding the second power corresponds to the predetermined monitoring period.

4. The power providing device according to claim 1, wherein the processor is arranged to determine a first derivative of the forwarded power,
wherein the processor is arranged to control switching to the ON-state when the processor detects that the first derivative of the forwarded power exceeds a predetermined detection derivative threshold wholly during the predetermined monitoring period or that an average of the first derivative of the forwarded power over the predetermined monitoring period exceeds the predetermined detection derivative threshold.

5. The power providing device according to claim 1, wherein the processor has a standby state and a control state, wherein the processor is arranged to switch from the standby state to the control state when an increase of the power forwarded detected over a predetermined pre-detection monitoring period exceeds a predetermined pre-detection threshold, and
wherein, in the control state, the processor is arranged to control switching to the ON-state when the increase of the power forwarded over the predetermined monitoring period exceeds the predetermined detection threshold,
wherein the predetermined pre-detection monitoring period is longer than the predetermined monitoring period and/or the predetermined pre-detection threshold is lower than the predetermined detection threshold.

6. The power providing device according to claim 1, wherein the standby power source is a power source device arranged to provide power to multiple power providing devices and/or power receiving devices,
wherein the processor negotiates an amount of provided standby power with the power source device.

7. The power providing device according to claim 1, wherein the standby power source is at least one of an external power bus and a battery.

8. The power providing device according to claim 1, wherein the power providing device is a power source equipment according to a Power-over-Ethernet standard.

9. The power providing device according to claim 8, wherein the power providing device is arranged to receive standby power from the standby power source according to the Power-over-Ethernet standard.

10. The power providing device according to claim 1,
wherein the processor is arranged to compare the power forwarded and/or an amount of power forwarded to a particular power receiving device with a respective overpower threshold,
wherein the power providing device is arranged to shut down a forwarding of power to one or more of the power receiving devices based on a comparison of the power forwarded and/or the amount of power forwarded to the particular power receiving device with the respective overpower threshold.

11. The power providing device according to claim 1, wherein the processor is arranged to adjust the predetermined monitoring period.

12. The power providing device according to claim 1, wherein the processor is arranged to detect communication data provided to one or more of the power receiving devices, and arranged to control the switching to the ON-state when the detected communication data indicates an imminent increase in a power demand of the one or more of the power receiving devices.

13. A power distribution system, comprising:
an operation power source,
a standby power source, providing less power than the operation power source,
the power providing device according to claim 1 coupled to the operation power source and the standby power source, and
a plurality of power receiving devices coupled to the power providing device.

14. A method of providing power to a plurality of power receiving devices by a power providing device, the method comprising the steps of:
receiving, in an operation mode of the power providing device, operation power from an external operation power source,
receiving, in a standby mode of the power providing device, standby power from a standby power source using an incoming port, the standby power being lower than the operation power,
forwarding the operation or standby power received to one or more power receiving devices,
controlling switching between an ON-state and an OFF-state of an operation mode power receiving interface,
monitoring power forwarded during the standby mode by sampling said power at a periodic rate, and adjust the periodic rate using an adaptive sampling technique, wherein when a difference in current samples is higher than a predetermined threshold time between samples is reduced, and
wherein controlling the switching includes switching to the ON-state when an increase of the power forwarded detected over a predetermined monitoring period exceeds a predetermined detection threshold, thus switching from the standby mode to the operation mode.

15. A computer readable non-transitory medium having stored therein instructions that are executed by a processor to cause the processor to perform a method of providing power to a plurality of power receiving devices by a power providing device, the method comprising:
receiving, in an operation mode of the power providing device, operation power from an external operation power source,
receiving, in a standby mode of the power providing device, standby power from a standby power source using an incoming port, the standby power being lower than the operation power,
forwarding the operation or standby power received to one or more power receiving devices,
controlling switching between an ON-state and an OFF-state of an operation mode power receiving interface,
monitoring power forwarded during the standby mode by sampling said power at a periodic rate, and adjust the periodic rate using an adaptive sampling technique, wherein when a difference in current samples is higher than a predetermined threshold time between samples is reduced, and
wherein controlling the switching includes switching to the ON-state when an increase of the power forwarded detected over a predetermined monitoring period exceeds a predetermined detection threshold, thus switching from the standby mode to the operation mode.

* * * * *